Patented Sept. 22, 1936

2,055,423

UNITED STATES PATENT OFFICE 2,055,423

SWEETENING PROCESS

Arnold Belchetz, Houston, Tex., assignor to Shell Development Company, San Francisco, Calif., a corporation of Delaware No Drawing. Application April 6, 1935, Serial No. 15,091

4 Claims. (Cl. 196—33)

This process pertains to the treatment of liquid solutions containing sulfur compounds known as thio-alcohols or mercaptans, and is more particularly concerned with a method of refining hydrocarbon or other organic mixtures containing such compounds.

Although various methods, such as oxidation, scrubbing with concentrated caustic soda, etc., have been developed to remove these compounds, by far the most widely used process for this purpose is the "doctor treatment", which consists in agitating a "sour", or mercaptan-containing hydrocarbon mixture, with an aqueous alkaline solution of sodium plumbite and a small quantity of free sulfur.

The doctor treatment, however, is a relatively costly and uneconomical process in view of the large quantities of the sodium plumbite required. It has in addition the drawback of necessitating an extremely careful control, and of increasing rather than decreasing the amount of free or corrosive sulfur left in the sweetened distillate, which often results in products having a poor color stability and an unsatisfactory copper strip test.

It is the object of this invention to provide a sweetening process in which a doctor-sweet, non-corrosive distillate of good color stability and odor is obtained by treatment with relatively small amounts of sodium plumbite. This process may be applied for sweetening any liquid solution containing mercaptans, such as straight run or pressure distillates and other hydrocarbon oils either natural or synthetic, like products of hydrogenation and/or polymerization as well as non-hydrocarbon solutions, like synthetic alcohols or ketones, and in general any solutions containing mercaptans. The process is particularly suitable for sweetening neutralized acid treated cracked distillates.

I have discovered that in order to sweeten a sour solution it is not necessary to have all the mercaptans converted to lead mercaptides as a preliminary step. I have found that under certain conditions it is possible to effect the oxidation of mercaptans (i. e. sweetening) by means of free sulfur, in the presence of lead mercaptides. Under these conditions lead mercaptides appear to act as catalysts in promoting the sweetening reaction between mercaptans and the oxidizing agent. I have found that this sweetening reaction proceeds apparently simultaneously with a relatively slow decomposition of lead mercaptides, so that at the end, if a sufficient quantity of the oxidizing agent was used, both the mercaptans and mercaptides are decomposed and the originally sour solution is sweetened at the expense of free sulfur and sodium plumbite which are converted into PbS and NaOH. It is evident that by practising my process a great economy and saving of valuable litharge and alkali is effected.

Briefly stated, my process consists in treating with an alkaline plumbite only a relatively small quantity of a sour solution, thereby converting the mercaptans into lead mercaptides, and thoroughly blending said treated solution with another quantity of a solution containing free mercaptans and free sulfur. The resulting mixture becomes sweet and lead sulfide formed from the decomposition of mercaptides separates out and can be removed from the treated liquid by settling, filtering or centrifuging.

By "blending" is meant the step of combining two liquids to form a solution; often it is desirable to accompany this step of bringing two liquids together by vigorous agitation to effect homogeneity and to promote chemical interaction of dissolved reagents.

For example, a portion of a sour distillate from a Persian crude having a free sulfur content of the order of 0.005% was treated with an excess of an aqueous sodium plumbite solution suitable for doctor treatment and the hydrocarbon solution of lead mercaptides thus obtained was blended with varying proportions of the untreated portion of the same sour distillate. The following results were obtained from the blends made:

| Blend | | | |
|---|---|---|---|
| No. | Sodium plumbite treated distillate in volumes | Untreated distillate, in volumes | Doctor test |
| 1 | 1 | 1 | Negative. |
| 2 | 1 | 3 | Do. |
| 3 | 1 | 4 | Slightly positive. |
| 4 | 1 | 5 | Positive. |

It will be seen that in this case a unit volume of the lead mercaptide solution (sodium plumbite treated distillate) was blended with from 100% to 500% by volume of the distillate containing free mercaptans and free sulfur, and that a complete sweetening of the mixture was obtained with as little as 25% of the total distillate being treated with sodium plumbite. The sweetened distillate contained substantially no corrosive (free) sulfur. I have found that in many cases it is necessary to treat with plumbite not more than 30% of the total sour material, and that substantially any organic solution containing mercaptans may be sweetened by treating with sodium plumbite a portion not exceeding one-half of the total amount of said solution.

As in the case with the conventional doctor treatment, it is essential for the successful operation of the new process to have sufficient amounts of free sulfur present in the mixture containing both mercaptans and mercaptides. It is preferable to have free sulfur present in the combined solutions in the amount which is approximately equivalent to the amount of mercaptans, i. e., one mol of sulfur for two mols of mercaptans, although smaller or greater amounts of sulfur may be used. This sulfur may be naturally present in one or both solutions undergoing the treatment, or it may be added thereto before, during or after the two solutions are combined. However, when the naturally present amounts of free sulfur are insufficient to complete the sweetening, I prefer to add small amounts of free sulfur to the second solution, which was not treated with alkaline plumbite, and which is subsequently blended with the plumbite treated solution to effect the sweetening. Sulfur may be dissolved directly in the distillate to be treated, or introduced in the form of a solution in a suitable solvent. The completion of the sweetening reaction in the presence of sufficient or excessive amounts of free sulfur is indicated by the precipitation of PbS. However, in some cases even when stoichiometric amounts of free sulfur, mercaptides and mercaptans are brought together, the precipitation of lead sulfide does not take place readily; in such cases I prefer to combine the process of my invention with that described in the Snyder Patent No. 1,985,955 i. e., to complete the refining process by treating the solution whose color became brownish as the result of combining of mercaptans and mercaptides, with clay.

The distillates treated by this method are at least equal, and in many cases superior to those refined by a complete treatment with sodium plumbite with regard to the doctor test, corrosive sulfur test and color stability. They are decidedly superior in so far as odor is concerned, since the harsh odor which is characteristic of distillates refined by a complete sodium plumbite treatment is entirely absent in products sweetened by this method.

I claim as my invention:

1. In the process of treating a solution of mercaptans in an organic solvent to convert mercaptans to disulfides, the steps of dividing said solution into two portions, treating one portion with an alkaline plumbite reagent under conditions to convert mercaptans to mercaptides soluble in said solvent and blending the resultant solution of mercaptides with the untreated portion containing mercaptans in the presence of sulfur and in the absence of lead-containing reagents other than lead mercaptides, thereby converting mercaptans and mercaptides in the resulting mixture to disulfides.

2. In the process of treating a solution of mercaptans in an organic solvent to convert mercaptans to disulfides, the steps of dividing said solution into two portions in a ratio at least 1:3, treating the smaller portion with an alkaline plumbite reagent under conditions to convert mercaptans to mercaptides, separating the treated portion containing mercaptides from the reagent, and blending the said treated portion with the untreated portion containing mercaptans in the presence of free sulfur, thereby converting mercaptans and mercaptides contained in the resulting mixture to disulfides.

3. In the process of sweetening a hydrocarbon oil containing mercaptans, the improvement comprising treating said oil with sodium plumbite reagent under conditions to convert mercaptans to lead mercaptides, thereby forming a solution of lead mercaptides in the treated oil, separating said solution of mercaptides from the reagent and blending said solution with a hydrocarbon oil containing mercaptans in the presence of a sufficient amount of sulfur to convert the mercaptans and mercaptides in the resulting mixture to disulfides.

4. In the process of sweeting a sour hydrocarbon oil containing mercaptans, the step of mixing said oil with a solution consisting essentially of a hydrocarbon oil and lead mercaptides in the presence of an amount of sulfur sufficient to convert the mercaptans and mercaptides in the resulting mixture to disulfides, and in the absence of lead-containing reagents other than lead mercaptides.

ARNOLD BELCHETZ.